United States Patent
Meek et al.

(10) Patent No.: US 10,401,512 B1
(45) Date of Patent: Sep. 3, 2019

(54) MICROSEISMIC DENSITY VOLUME ESTIMATION

(71) Applicant: Pioneer Natural Resources USA, Inc., Irving, TX (US)

(72) Inventors: Robert Meek, Irving, TX (US); Bailo Suliman, Irving, TX (US); Robert Hull, Dallas, TX (US); Hector Bello, Flower Mound, TX (US); Douglas Portis, Irving, TX (US)

(73) Assignee: Pioneer Natural Resources USA, Inc., Irving, TX (US)

( * ) Notice: Subject to any disclaimer, the term of this patent is extended or adjusted under 35 U.S.C. 154(b) by 897 days.

(21) Appl. No.: 14/247,988

(22) Filed: Apr. 8, 2014

(51) Int. Cl.
*G01V 1/28* (2006.01)
*G01V 1/30* (2006.01)

(52) U.S. Cl.
CPC ............. *G01V 1/30* (2013.01); *G01V 1/282* (2013.01)

(58) Field of Classification Search
CPC .................................................. G01V 1/288
See application file for complete search history.

(56) References Cited

U.S. PATENT DOCUMENTS

| | | | |
|---|---|---|---|
| 8,359,163 B2 | 1/2013 | Bowen | |
| 8,370,122 B2 | 2/2013 | Walker et al. | |
| 2014/0262507 A1* | 9/2014 | Marson | E21B 7/10 175/24 |
| 2015/0057985 A1* | 2/2015 | Ma | E21B 43/26 703/2 |
| 2016/0273337 A1* | 9/2016 | Donderici | E21B 47/02216 |
| 2017/0002641 A1* | 1/2017 | Dykstra | E21B 44/00 |

OTHER PUBLICATIONS

Chorney, Drew et al., "Geometrical modeling of rock fracturing and associated microseismicity," The Leading Edge, Passive Seismic and Microseismic—Part 1, Nov. 2012, pp. 1348-1354.
Maxwell, Shawn, "What Does Microseismic Tell Us About Hydraulic Fractures?" Recovery—CSPG CSEG CWLS Convention, 2011, 5 pages.
Meek, Robert et al., "What Broke? Microseismic analysis using seismic derived rock properties and structural attributes in the Eagle Ford play," Unconventional Resources Technology Conference, 2013, 12 pages.
Refunjol, Xavier E. et al., "Integration of hydraulically induced microseismic event locations with active seismic attributes: A North Texas Barnett Shale case study," Society of Exploration Geophysicists, Geophysics, vol. 77, No. 3, 2012, pp. KS1-KS12.
Suliman, B. et al., "Variable Stimulated Reservoir Volume (SRV) Simulation: Eagle Ford Shale Case Study," Unconventional Resources Technology Conference, 2013, 9 pages.

* cited by examiner

*Primary Examiner* — Manuel A Rivera Vargas
(74) *Attorney, Agent, or Firm* — Blank Rome LLP

(57) ABSTRACT

Rock properties and structural attributes can be combined with an ellipsoid stimulation model around a well bore. A stepwise regression or other optimization analysis can then used to determine what property(ies) and/or attribute(s) has the greatest impact on the shape and properties of a microseismic density volume and can be best used to predict the same. These same properties and/or attributes can then be used to create a microseismic density volume around another nearby well where microseismic data was not recorded to estimated a stimulated reservoir volume.

24 Claims, 8 Drawing Sheets
(5 of 8 Drawing Sheet(s) Filed in Color)

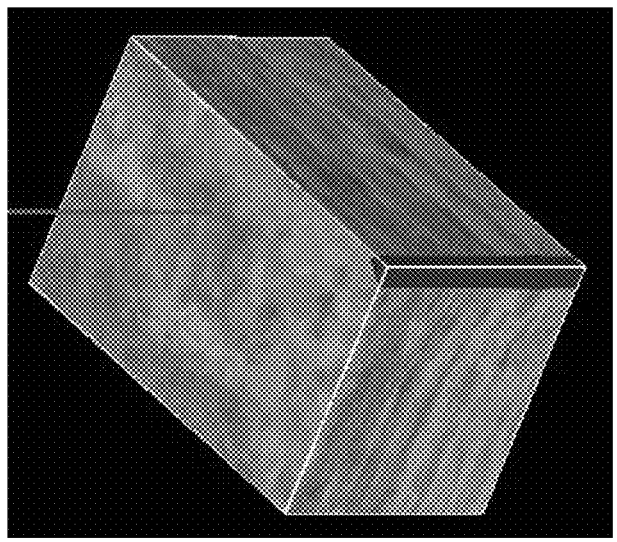
Fig. 4C Poisson's Ratio
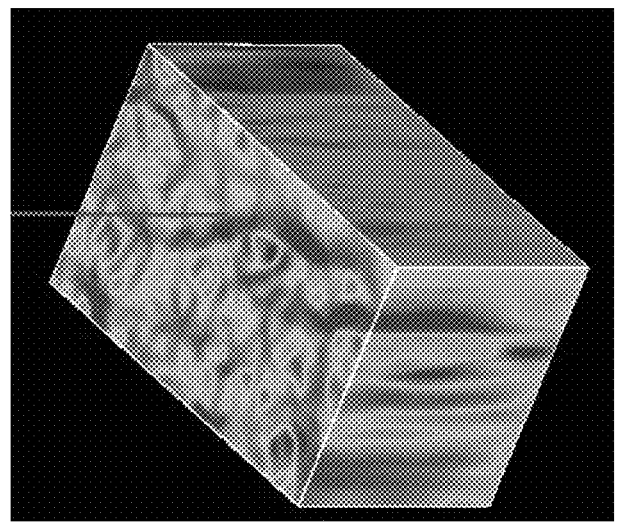
Fig. 4B Curvature
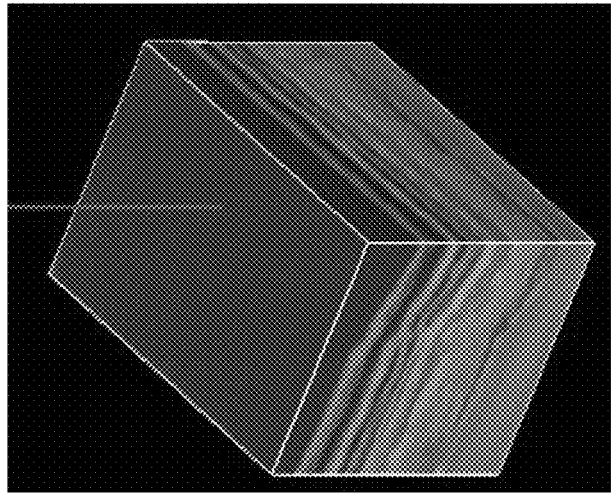
Fig. 4A Young's Modulus

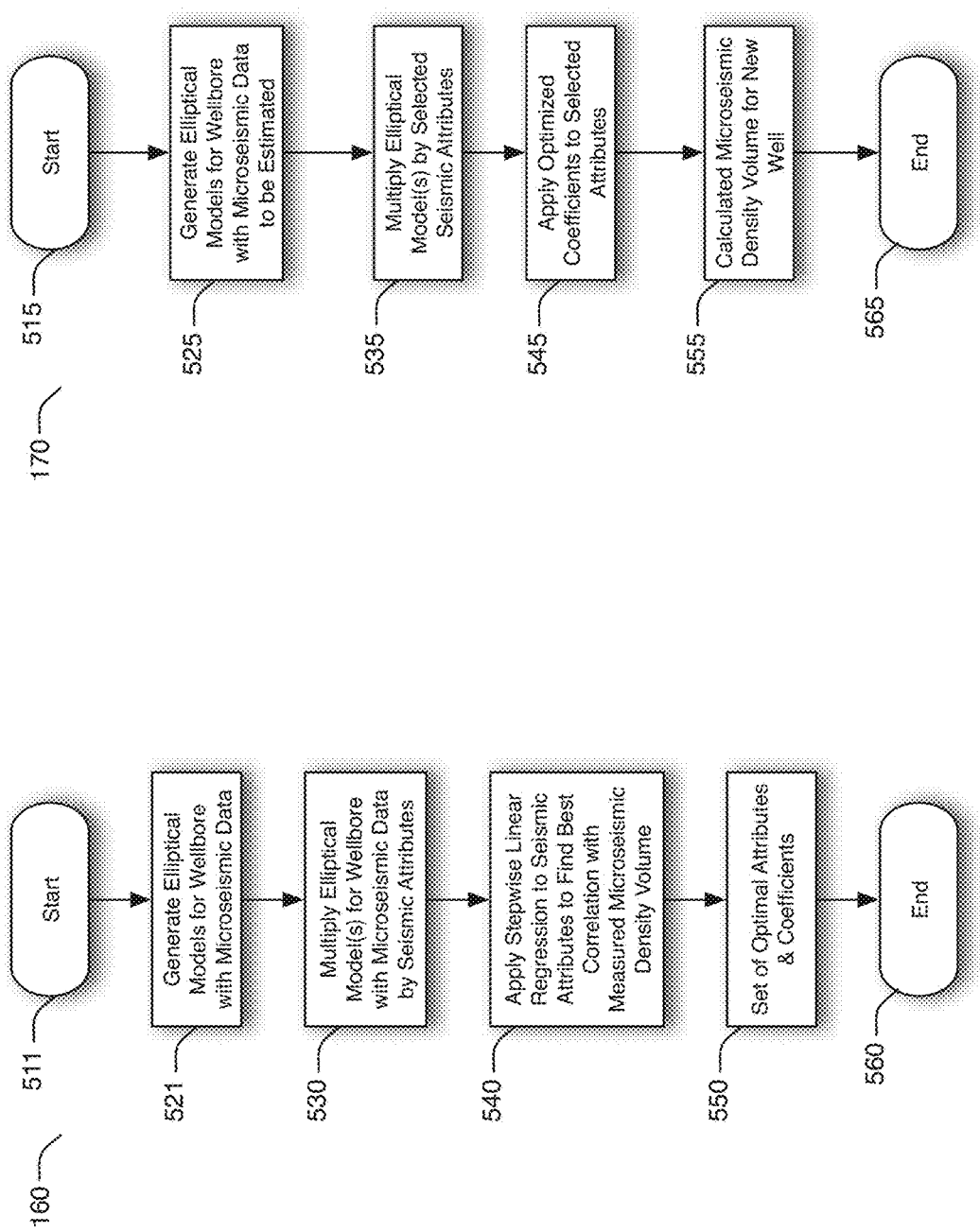

MICROSEISMIC DENSITY VOLUME ESTIMATION

BACKGROUND

In hydrocarbon development it is common practice to inject fluids and proppant into the subsurface to create and maintain fractures or open exiting fractures in rocks containing hydrocarbons locked in pore spaces. This process is known as hydraulic fracturing or "fracking." The fractures produced by this technique ideally would be connected to the well bore and create a conduit from which valuable hydrocarbons can then be produced. Microseismic survey analysis can be used to analyze the fracturing process. More specifically, to record where these fractures are created, geophones can be placed in nearby wells, on the surface, or in shallow wells. When the fractures are created they cause acoustical emissions or vibrations that transmit as particle motion through the earth (essentially micro-earthquakes) to the geophones, where the vibrations can be recorded as a function of time. These recorded vibrations as a function of time can be further processed by a computer in known ways to locate the hypocenters (positions) and magnitudes of the fracture events. The hypocenter locations and magnitudes are commonly interpreted by geophysicists, completion and reservoir engineers to determine how effective the stimulation was, what barriers were encountered during stimulation, and areas where the stimulation may not have been as effective.

To better understand the results of a stimulation (e.g., what size the stimulation was and how effective it was in different parts of the formation), microseismic density volumes can be created using known techniques, such as an event count distribution or a moment magnitude calculation, as shown in Maxwell, Shawn C., What Does Microseismic Tell us about Hydraulic Fracture Deformation, Recorder, Canadian Society of Exploration Geophysics, October 2011, which is hereby incorporated by reference in its entirety. These microseismic density volumes can then be used as an estimate of the stimulated rock volume as described in Suliman, B., Meek, R., Hull, R., Bello, H., Portis, D., and Richmond, P.; Variable Stimulated Reservoir Volume (SRV) Simulation: Eagle Ford Shale Case Study, Unconventional Resources Technology Conference, August, 2013, which is hereby incorporated by reference in its entirety.

It has been observed that the distribution and locations of microseismic events appear to vary with rock properties and curvature attributes. See, e.g., Usher, Christopher T., 3-D Data Aid Shale-Field Development, American Oil and Gas Reporter, January 2012; see also Refunjol, Xavier E., Keranen, Katie M., Le Calvez, Joel H, and Marfurt, Kurt J., Integration Of Hydraulically Induced Microseismic Event Locations With Active Seismic Attributes: A North Texas Barnett Shale Case Study, Geophysics, Vol. 77, no. 3. Additionally, it has also been observed that, with microseismic observations, geo-mechanical modeling can be used to see how a rock would break. See, e.g., Chorney, Drew, Piyush Jain, Grob, Melanie, and Van Der Baan, Mirko, Geomechanical Modeling And Rock Fracturing And Associated Microseismicity, The Leading Edge, November, 2012. In the case of these and other prior art techniques involving analysis of microseismic data, the microseismic data is just used as an observation or input into the process. None of these techniques involve the creation or invention of a microseismic density volume.

However, acquisition of microseismic data can be time consuming and expensive, so it is not necessarily collected in every fracture treatment and may not be available in all instances in which reservoir or completions engineers might have a use for such data. Thus, in many cases it would be desirable to create or invent a microseismic density volume (or its equivalent) so that the advantages of microseismic data analysis may be deployed on a wider scale.

SUMMARY

Disclosed herein are techniques for deriving a microseismic density volume which can be used as a proxy of a stimulated reservoir volume using microseismic data recorded at a another location (i.e., at another well) and seismic structural, geomechanical and rock properties estimates that cover both the other well and the well of interest. It is believed that, and experimental evidence has verified, that the rock will behave sufficiently similarly to what it did at the well with where the microseismic was recorded that useful predictions and characterizations of the formation may be made using the data.

One aspect of the present disclosure relates to a technique for estimating a stimulated reservoir volume in the subsurface using microseismic data recorded at another well stimulation and surface seismic structural and elastic attributes covering both wells. To do so, a microseismic survey can be acquired at a hydraulic stimulation of a first well. This microseismic data can be processed to produce hypocenter locations, which can be further processed to create a microseismic density volume. This microseismic density volume can be treated as equivalent to a stimulated reservoir volume (SRV). Additionally, a three-dimensional (3D) surface seismic data set can be recorded and processed. The surface seismic recording can be further processed to determine structural attributes of the formation or formations of interest. Such attributes can include parameters such as curvature and coherency and elastic attributes such as Young's modulus, Poisson ratio, p-wave velocity, s-wave velocity, and density.

One or more ellipsoidal models can be created around each of the wellbore where the microseismic data was recorded and the wellbore of interest (i.e., the well location where an estimate of the SRV is to be made). These ellipsoidal models can then be multiplied by the surface 3D seismic attributes resulting in several attribute models. An optimization technique, such as step-wise linear regression, can be used in conjunction the attribute models for the wellbore of interest to determine the best attribute model and associated coefficients to predict the actual microseismic density volume for the wellbore where the microseismic data was recorded. These "best fit" attribute models and associated coefficients can then be used to calculate or derive an estimate of the microseismic density volume at the wellbore of interest for a stimulation treatment of a given nature.

Another aspect of the present disclosure relates to use of the results of the estimated simulated reservoir volume in the design of drilling or completions operations. For example, depending on the results of an analysis, a reservoir or completions engineer might select an optimal spacing of wells to maximize recovery of hydrocarbons while minimizing costs. Alternatively or additionally, a completions engineer can review the projected results of a stimulation to determine whether the desired result will be achieved or whether modifications to the stimulation (such as the number of zones, pressure, volume, propant type or quantity, etc.) should be changed to achieve an optimal result.

These and other aspects may be better understood by reference to the following drawings and detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4C illustrate various three dimensional depictions of rock parameters measured using surface seismic data in accordance with some embodiments of the present invention.

FIG. 5A illustrates a flow chart for an optimization analysis to determine seismic attributes, rock properties, and coefficients for prediction of a microseismic density volume.

FIG. 5B illustrates a flow chart for using optimized seismic attributes, rock properties, and coefficients to generate a predicted microseismic density volume.

DETAILED DESCRIPTION

Figure 1:
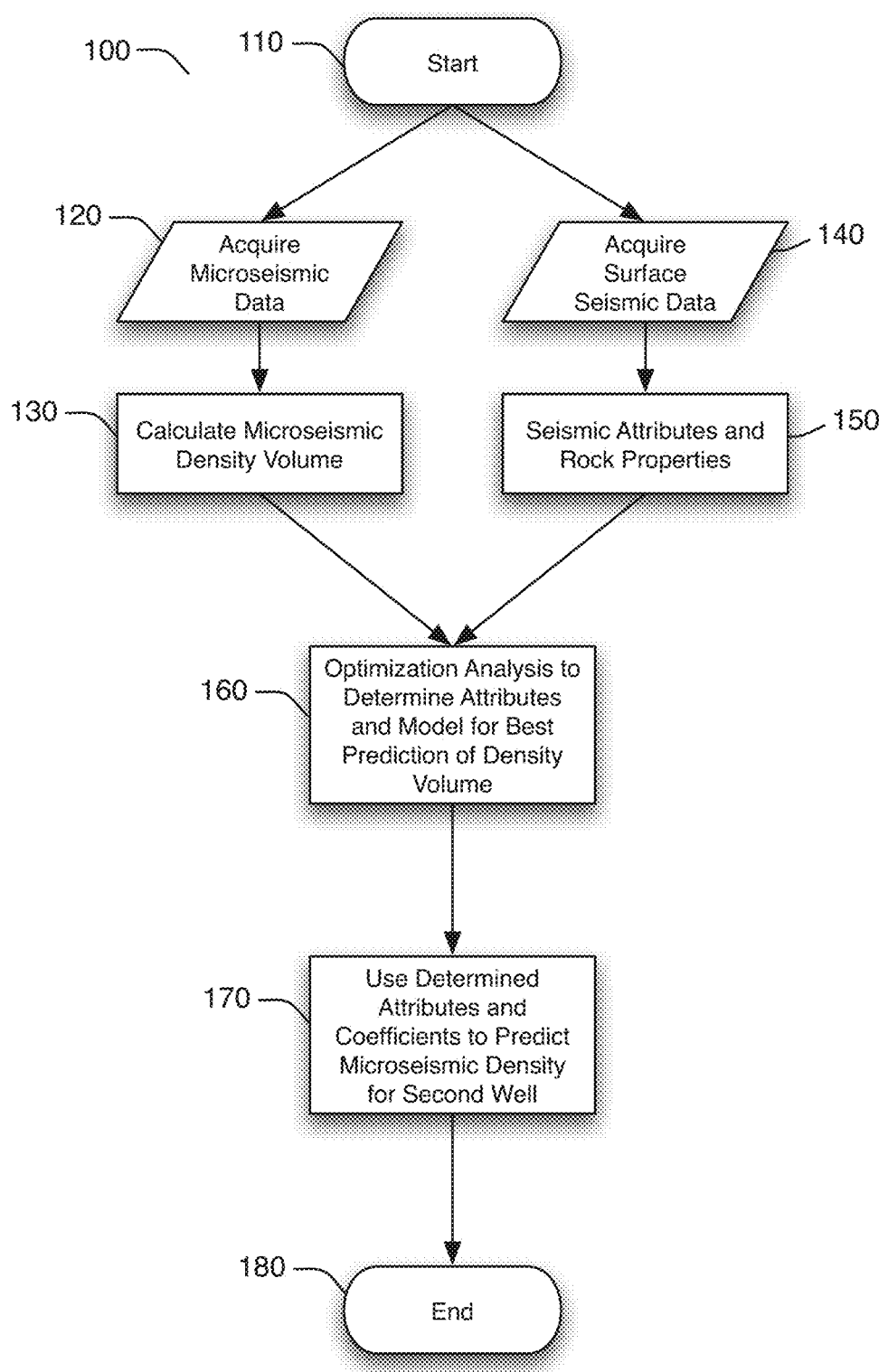
FIG. 1 illustrates a flow chart of a method of estimating a microseismic density volume for a well.

With reference to FIG. 1, a method 100 of estimating a stimulated reservoir volume using seismic attributes, well bore models, and microseismic data is described. The method commences at step 110. The analysis requires acquisition of two separate data sets, a microseismic data set from the stimulation of a first well and a surface seismic data set that will be applicable to both the first well and a second well. The method thus includes a step 120 for the acquisition of microseismic data using any one of numerous well-known techniques. These techniques can include the use of downhole receivers, surface receivers, or shallow receivers in shallow instrument wells, or any combination of these to acquire the microseismic data relating to a stimulation of a given wellbore. The acquired microseismic data can be processed in known ways to record a number of microseismic hypocenters defined as h(x,y,z), where x, y, and z refer to locations in the subsurface.

Figure 2:
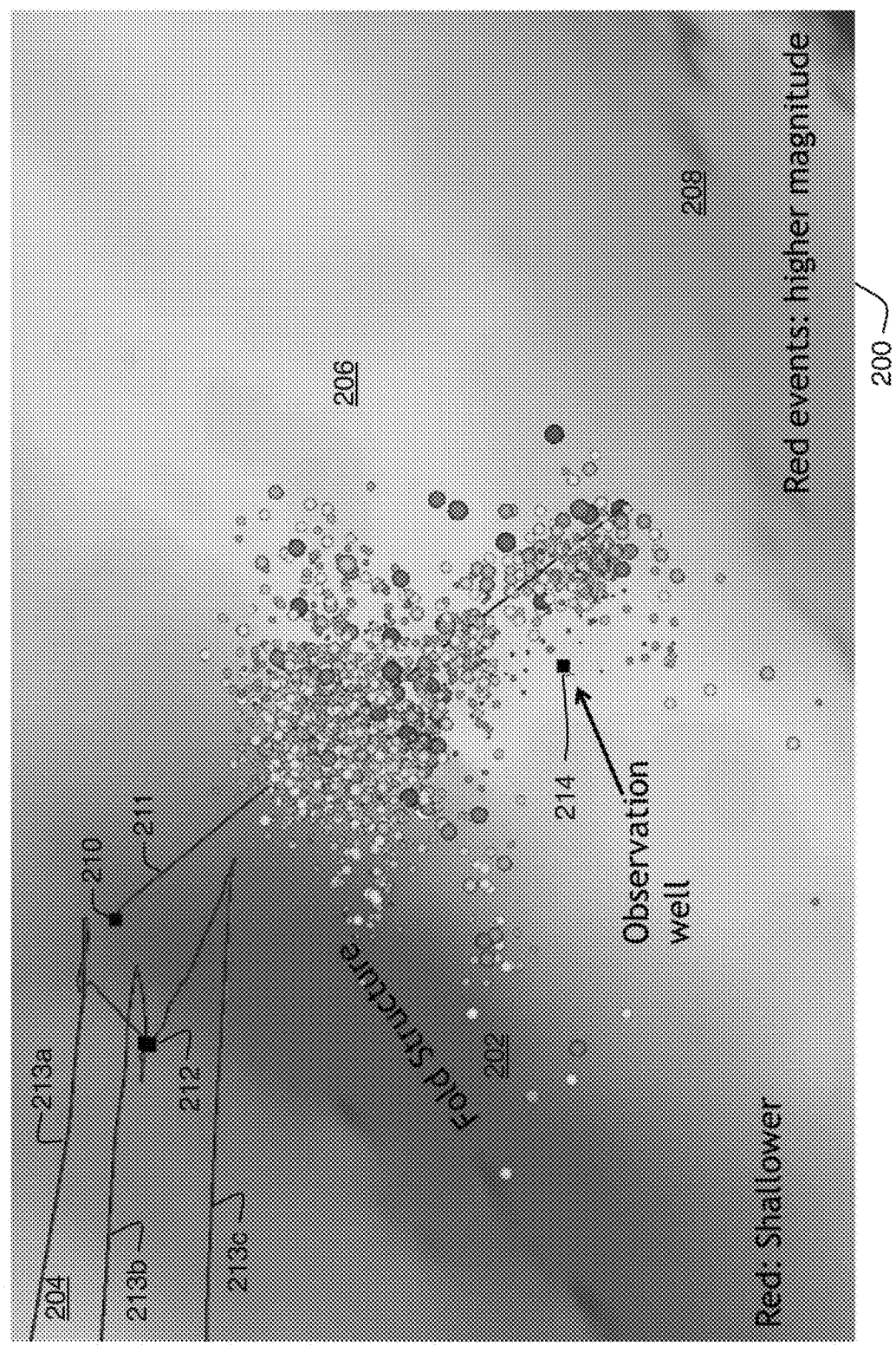
FIG. 2 illustrates a plan-view structure map depicting an exemplary formation with a plurality of wellbores and a plurality of microseismic event hypocenters superimposed thereon.

FIG. 2 shows a diagram of typical microseismic events overlying a structural map, i.e., an overhead view of a region of interest. In the illustration of FIG. 2, the background shading represents the depth of a formation of interest (in this case a portion of the Eagle Ford shale located in South Texas). Shaded area 202 corresponds to a peak, i.e., a location at which the formation of interest is at its shallowest depth from the surface. Shaded areas 204 and 206 correspond to an area where the formation is at a greater depth below the surface, with shaded area 208 corresponding to an area where the formation is deeper still. It can thus be seen that the formation has what is known as a fold structure in the region of area 202, where the formation is at its shallowest, descending towards areas 204 and 206.

Also depicted in FIG. 2 are three surface well pad locations 210, 212, and 214. From a surface location a near vertical well 210 has a near horizontal lateral 211 for which microseismic data will be recorded. This near vertical well 210 is drilled down and goes horizontal here depicted with a lateral portion 211. Surface pad location 212 has three near vertical wells for which microseismic data will be estimated according to the techniques described herein over three laterals 213a, 213b, and 213c. Finally, well 214 is a vertical observation well in which seismic receivers are placed for collecting the microseismic data associated with the stimulation of well 211. Finally, FIG. 2 also depicts a multitude of recorded microseismic hypocenters associated with the stimulation of lateral 211. Each of these microseismic hypocenters corresponds to a "micro-earthquake" associated with the fracture treatment. The microseismic hypocenters are sized and shaded according to their magnitude such that the larger hypocenters correspond with larger events.

Turning back to FIG. 1, at step 130 the microseismic hypocenters h(x,y,z) referenced above are converted into a microseismic density volume. This microseismic density volume can be based on event count per unit volume, event magnitude per unit volume, or a combination of the two. In one embodiment, this microseismic density volume can be generated as follows. A three dimensional matrix, A, is defined around the well bore. Matrix A can have dimensions nx, ny, nz (i.e., nx elements in the x-direction, ny elements in the y-direction, and nz elements in the z-direction), with matrix indices i, j, and k corresponding to the x-, y-, and z-directions, respectively. The hypocenter locations h(x,y,z) can then be converted to grid locations h(i,j,k), where i=x/dx, j=y/dy and k=z/dz (with dx, dy, and dz being the size of the each grid node). A number of hypocenters, v, in each node can then be determined. The microseismic density volume can then created using the following equation:

$$a_{ijk} = \sum_{l=1}^{v} M_{ijk,l} h_{ijk,l}$$

where M is the magnitude of the microseismic hypocenter, h is the node location and a is the element in matrix A.

Depending on how sparsely the microseismic events are separated, it may be desirable to apply some sort of smoothing or filtering to the microseismic density volume A. In one embodiment, the microseismic density volume A can be smoothed by applying a three dimensional convolutional operator, B. In some embodiments, all the elements of B are set to 1. In other embodiments, another filter, such as cosine or Gaussian type shape could be used. In any case, the final, smoothed microseismic density volume C can be calculated according to the following equation:

$$c_{ijk} = \sum_{l=-p}^{p} \sum_{m=-q}^{q} \sum_{n=-r}^{r} b_{lmn} a_{i-l,j-m,k-n}$$

where $b_{lmn}$ are elements in a 2p×2q×2r matrix, B, and $c_{ijk}$ are the elements in the final microseismic density volume, C.

Figure 3:
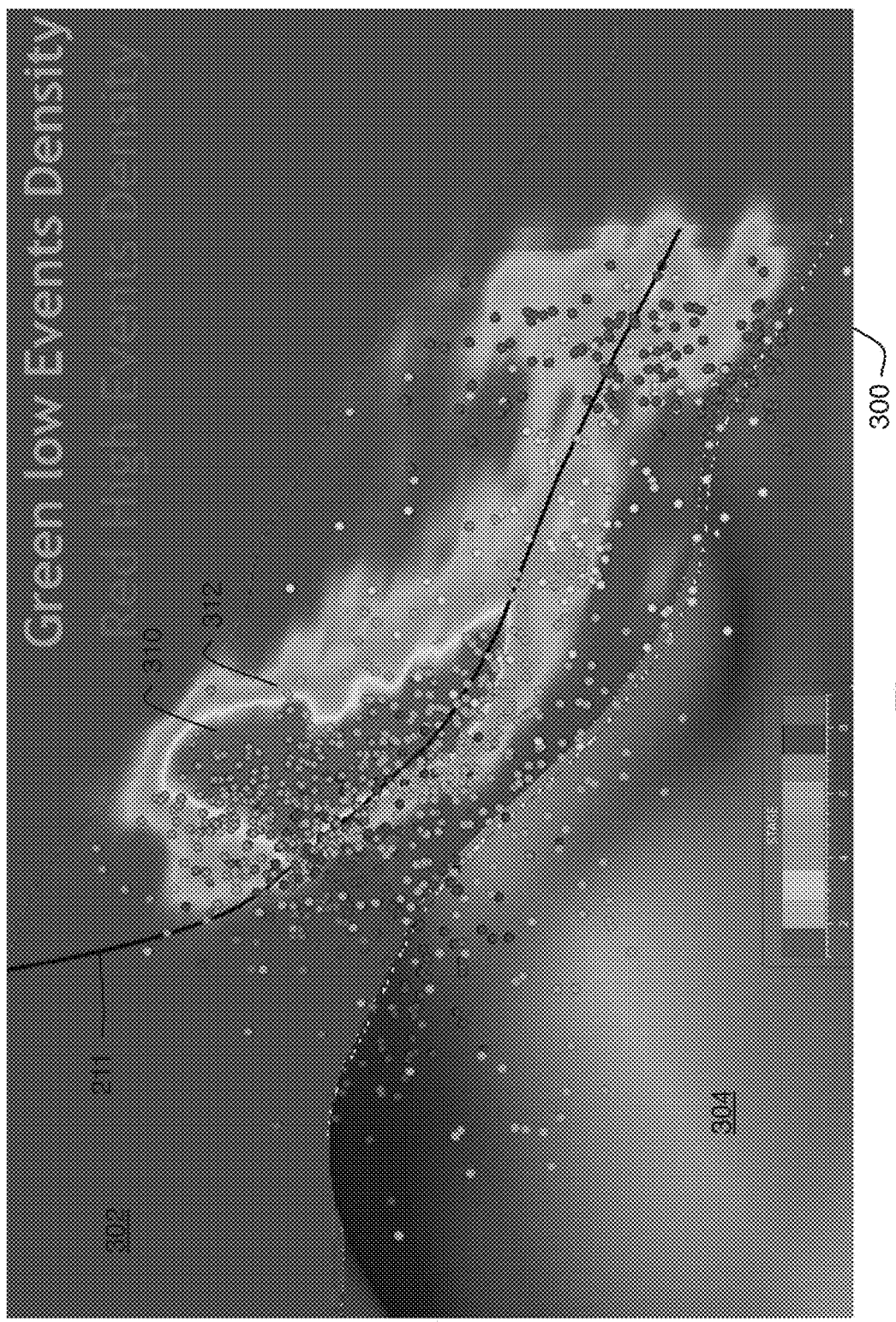
FIG. 3 illustrates a section-view map sliced through a formation, showing a wellbore and a plurality of microseismic event hypocenters associated with a stimulation of the wellbore.

FIG. 3 shows a vertical slice 300 through a microseismic density volume calculated from the microseismic density data shown in FIG. 2. More specifically, FIG. 3 depicts an upper region 302, which is the formation of interest, and lower region 304, which is an underlying formation. Also depicted is lateral 211. Along lateral 211, a nine stage fracture treatment was applied, starting with the lower zones in the toe region of lateral 211 extending up the hole to the heel region of lateral 211. Microseismic events associated with each fracture treatment are shown as well, with the shading of these events corresponding to the stage. Finally, the microseismic density volume calculated as set forth above is illustrated by the shading in the upper region 302, with the brighter shaded regions 310 corresponding to regions of higher event density and the darker regions 312 corresponding to lower density, all the way down to background colored region 302 showing no events.

A number of observations can be made from the microseismic density volume and microseismic density events depicted in FIG. 3. First, it can be seen that the most effective stimulation occurs in the heel region of lateral 211, corresponding to higher event density 310. This also corresponds to stimulation stages seven and eight. Somewhat effective stimulation out a significant distance from the wellbore occurred in the toe region of lateral 211, corresponding to the first fracture treatment stage. Less effective stimulation occurred in the middle regions between the heel and toe of the lateral where there are relatively fewer microseismic events, which are also located relatively close to the wellbore. Additionally, it can be observed that there is significant penetration of the formation underlying the region of interest, particularly with respect to stages one (near the toe), four (from the middle of the lateral upward) and seven (near the heel). Depending on the particular geology, these penetrations may not be desirable as they may lead to increased water infiltration and production or other undesirable effects.

Returning to FIG. 1, at step 140, surface 3D seismic attributes and rock properties attributes are acquired. This data should be for a region that covers both the well of interest, for which microseismic density volume will be estimated, and the well for which microseismic data will be actually acquired. This surface seismic data can be acquired before, after, or even contemporaneously with the acquisition of the microseismic data according to any of a variety of known techniques. In many cases this surface seismic data will have been obtained at some time prior to the stimulation of the well and acquisition of microseismic data. In step 150, the surface seismic data obtained can be processed or used to calculate curvature volumes to define structural features and/or coherency volumes to define natural faults. Additionally, rock property attributes derived from seismic prestack inversion such as p-wave velocity, s-wave velocity, density, acoustic impedance, shear impedance, and their associated attributes such as Bulk modulus, Young's modulus, and Poisson's ratio can be calculated. Exemplary three dimensional plots of three surface seismic derived parameters (Young's modulus, curvature, and Poisson's ratio) are depicted in FIGS. 4A, 4B, and 4C, respectively.

Again with reference to FIG. 1, at step 160 an optimization analysis of the seismic attributes and rock properties that generates the best prediction of density volume is performed. The optimization analysis may take a variety of forms. In one embodiment, discussed further below, a stepwise regression analysis can be used. In other embodiments, singular value decomposition, neural networks, or other techniques of solving optimization problems can be employed. In many cases, commercial software packages are available to perform the required calculations, although custom developed software could also be used.

Turning now to FIG. 5A, an exemplary optimization analysis 160 based on stepwise regression is illustrated. The process begins at step 511. At step 521, one or more ellipsoidal models are generated around the well bore for which microseismic data was recorded. These ellipsoidal models may be thought of as idealized results of a stimulation treatment, in which an idealized stimulated volume is created around the wellbore. This ellipsoidal volume is centered on the wellbore, substantially uniform along its length, confined to the formation of interest, and illustrates a greater degree of fracturing nearer the wellbore with a lesser degree of fracturing as one moves radially away from the wellbore.

Figure 6:
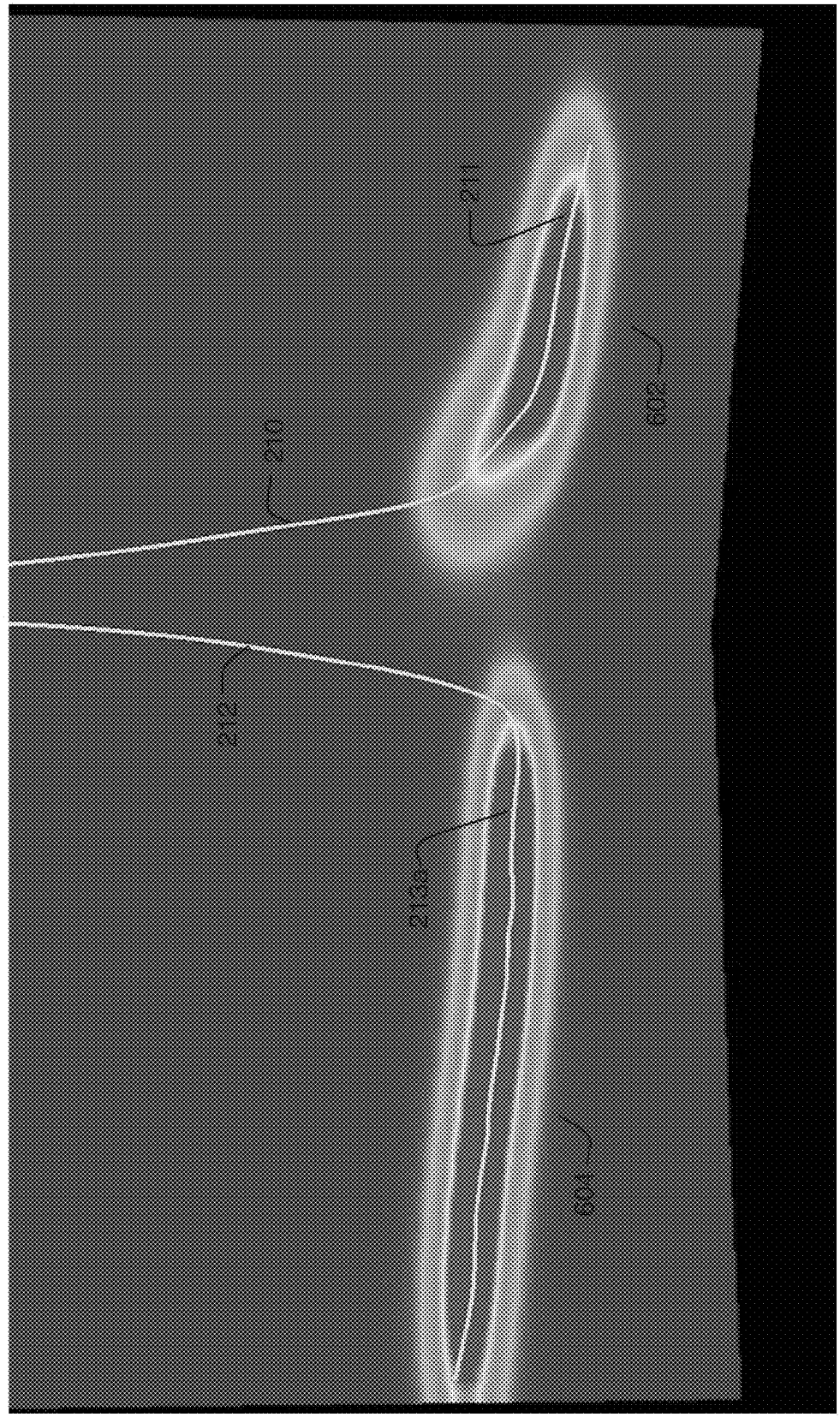
FIG. 6 illustrates a sectional view of a plurality of wellbores and ellipsoidal stimulation models used in some embodiments of the estimation algorithm described herein.

From a more practical perspective, creation of the ellipsoidal models is similar to the creation of the microseismic density volume in step 130 illustrated in FIG. 1 and discussed above. More specifically, the well bore can be defined as positions w(x,y,z) indicating the portion of the well bore to model. A matrix E can be defined around the well bore at the same size as matrix A. The positions of the well bore are converted to grid locations using i=x/dx, j=y/dy and k=z/dz, as discussed above. Various convolution operators can then be used to create the ellipsoidal models around the well bores. FIG. 6 illustrates a sectional view of two ellipsoidal models. Ellipsoidal model 602 corresponds to lateral 211 for which microseismic data was obtained. As above, shading is used to indicate the degree of fracturing in this idealized model.

It should be noted that more than one ellipsoidal model can be created by selection and application of the various convolution operators. The person skilled in the art will be able to select and determine one or more models depending on actual geological conditions and the like.

Returning to FIG. 5A, at step 530, the one or more elliptical models for the wellbore having microseismic data recorded, $E_m$, can be multiplied by each of the acquired surface seismic attributes, $D_k$, (step 150, FIG. 1) to create a new set of model seismic attributes, $S_{mk}$:

$$S_{mk}=E_m D_k$$

At step 540 stepwise linear regression is used to select the set of attributes, $S_{mk}$, that best predict the microseismic density volume calculated in step 130 of FIG. 1. Those skilled in the art will be aware of numerous ways of approaching these calculations. One example is to apply methods similar to those described in Hampson, D., Schuelke, J., Quirein, J, 2001, Use Of Multiattribute Transforms To Predict Log Properties From Seismic Data, Geophysics, Vol. 66, No 1, pp. 220-236 (which is hereby incorporated by reference in its entirety). In some embodiments, a target "log" of a given parameter can be extracted from the microseismic density volume, M, as shown in the below equation. The coefficients $w_i$ can then be calculated using the following equation where * represents a convolutional operator over depth:

$$M=w_0+w_1*A_1+w_2*A_2+w_3*A_3\ldots$$

In addition to determining the coefficients, $w_i$, the algorithm can also perform mathematical operations on the target, M, and attributes A, such as 1/A, A^2, log(A), resulting in analyzing several hundred variations of attributes to derive the best predicted microseismic density volume. Additionally, it will be appreciated that a convolutional operator where several samples can be used to estimate a single value at the target log can be used to further improve the results. In any case, the result of this optimization step is an optimal set of coefficients, w, (also denoted as 550 in FIG. 5A) that can be used to generated a predicted microseismic density volume, C that best correlates with the measured microseismic density volume M.

Referring again to FIG. 1, at step 170, the attributes and coefficients that resulted in a generated microseismic density volume C that best matches the measured microseismic density volume M can be applied to predict a microseismic density volume for a well where a microseismic density volume is to be estimated. Further details of step 170 are illustrated in FIG. 5B. After starting at step 515, one or more ellipsoidal models of the same size as those created at step 400 can be generated around the new well bore at step 525. An ellipsoidal model around the well bore to be predicted is shown in the left in FIG. 6. More specifically, ellipsoidal model 604 corresponds to lateral 213a of wellbore 212, for which microseismic data will be estimated. This ellipsoidal model can be generated in the same fashion as discussed above. At step 535, the new ellipsoidal models can be multiplied seismic attributes. Preferably, the best attributes 550 as determined at step 540 can be selected to produce a new set of ellipsoidal attributes, $E_{mk}$ for the well for which microseismic data are to be estimated. Then, at step 545, the coefficients, w, from step 540 can be used to calculate a microseismic density volume, F, at the new well (also denoted as 555 in FIG. 5B).

Figure 7:
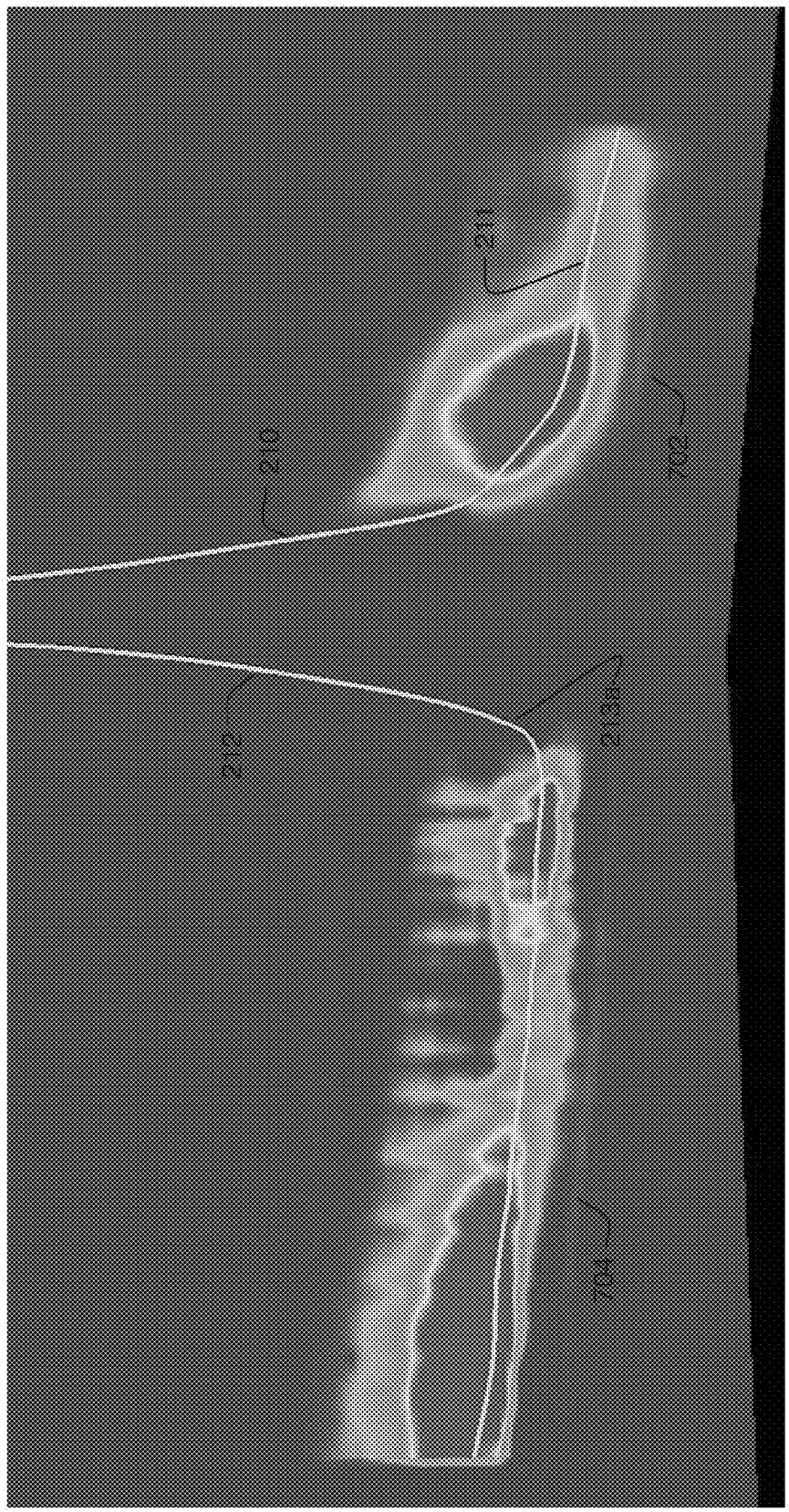
FIG. 7 illustrates a sectional view of a plurality of wellbores with a measured microseismic density volume for one wellbore and an estimated microseismic density volume for another wellbore.

Turning back to FIG. 1, at step 180, the process completes with an estimate of the stimulated reservoir volume ("SRV") or predicted microseismic density volume being produced. FIG. 7 shows an estimate of the SRV 704 for lateral 213, for which microseismic data was not recorded. Also illustrated in FIG. 7 is measured microseismic density volume/SRV 702 for lateral 211 for which microseismic data was recorded. The predicted SRV can be presented to the user in a variety of ways, including two-dimensional displays or printouts or three dimensional displays. These displays may be presented using known computer display and visualization techniques, including manipulable interactive displays in which the user can navigate various portions of the SRV or other wellbore region to study the results of the analysis.

The foregoing analysis and conclusion that predicted microseismic density volume can be used as an estimate of a stimulated rock volume at the well where microseismic events were not recorded is predicated on the assumption that the stimulation will be the substantially the same for the two wells (i.e., the one for which microseismic data was recorded and the one for which microseismic data was not recorded). It is assumed that minor variations in stimulation may be selected by a completions engineer in response to an analysis according to the foregoing technique. However, it is assumed that these perturbations will be relatively small with respect to the overall physical regime for which the results of such analysis will be valid. The analysis described above is further predicated on the assumption that the rock in the new well for which microseismic density volume is estimated will behave similarly to the rock at the original well for which microseismic data was recorded. (This assumption can be tested and verified by the skilled artisan using the surface seismic data acquired in the course of the analysis.)

Once a predicted SRV is derived as set forth above, the predicted SRV can be used by reservoir and completions engineers for a variety of commercially beneficial purposes. As one example, the predicted SRV can be used to select an optimal well spacing that will maximize the recovery of hydrocarbons with minimal well drilling costs. As another example, the predicted SRV can be used to predict possible stimulation outcomes. These possible stimulation outcomes can also be used to design optimal completion strategies. For example, in the analysis example shown in FIG. 7, the SRV 704 shows lesser penetration in the middle region between the heel and toe of the lateral. A completions engineer seeing this result for a specified stimulation might choose to use higher frac pressures, higher fluid volumes, or a different propant size or concentration in an effort to enhance the stimulation in this region. Other applications of a predicted SRV according to the teachings herein will also be apparent to the skilled artisan in light of the instant disclosure.

Some portions of the detailed description were presented in terms of processes, programs and workflows. These processes, programs and workflows are the means used by those skilled in the data processing arts to most effectively convey the substance of their work to others skilled in the art. A process or workflow is here, and generally, conceived to be a self-consistent sequence of steps (instructions) contained in memory and run or processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

Figure 8:
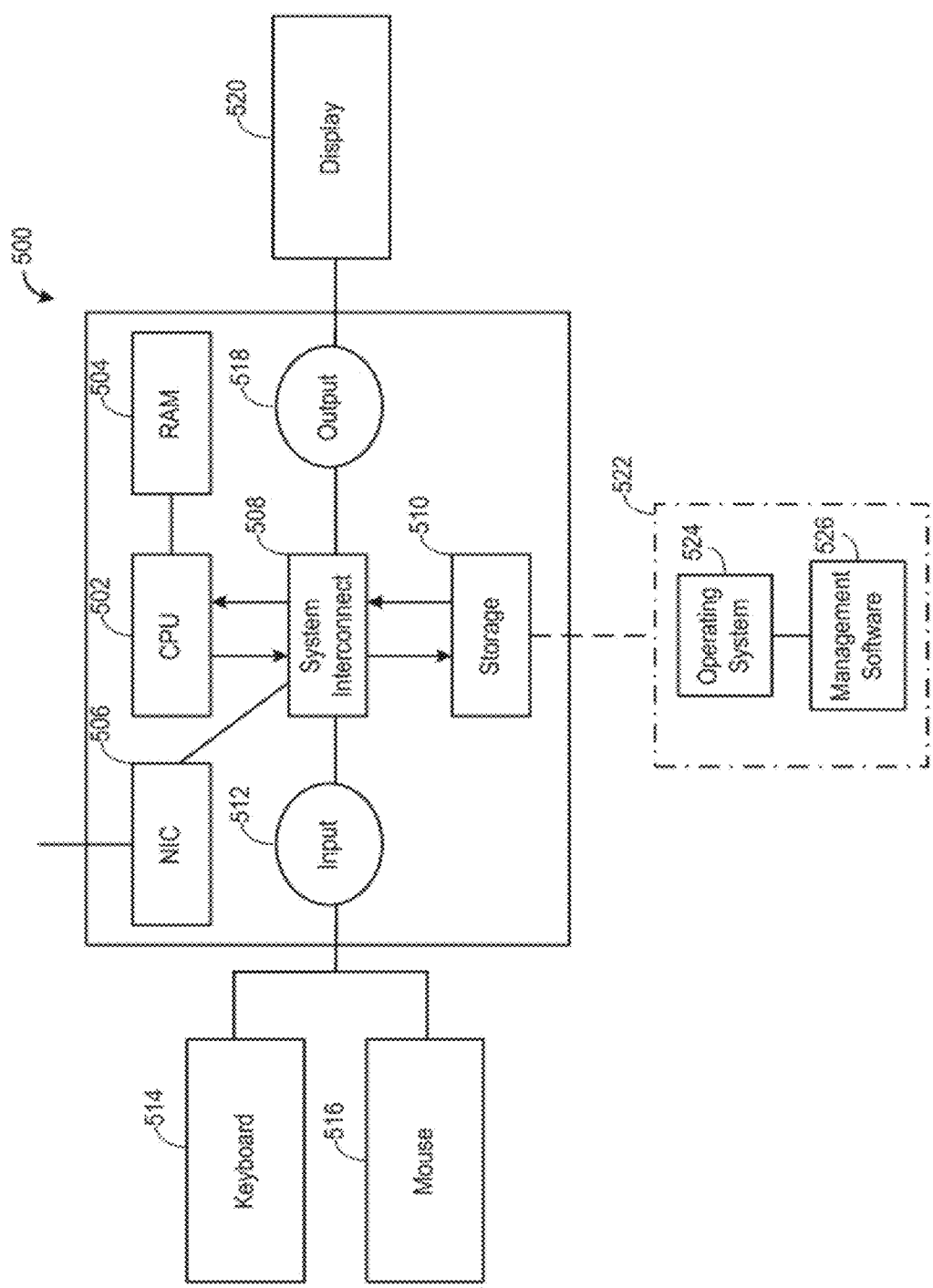
FIG. 8 illustrates a block diagram of a computer system that can be used to implement the analysis technique described herein.

The present invention also relates to an apparatus for performing the operations herein. This apparatus may be specially constructed for the required purposes, or it may comprise a general-purpose computer as shown in FIG. 8, selectively activated or reconfigured by a computer program stored in the computer. Such a computer program may be stored in a computer readable storage medium, such as 510, which could be, but is not limited to, any type of disk including floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor such as 502, or may be architectures employing multiple processor designs for increased computing capability.

The systems and techniques described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language, software application, or other system. It will be appreciated that a variety of languages, applications, systems, etc. may be used to implement the teachings of the present invention as described herein, and any references to specific languages, applications, or systems are provided only for purposes of enabling and disclosing the best mode of practicing the invention.

This application may contain copyrighted material of the Society of Petroleum Engineers, American Association of Petroleum Geologists, or other groups derived from the paper by Robert Meek, Bailo Suliman, Robert Hull, Hector Bello, and Doug Portis, entitled "What Broke? Microseismic Analysis Using Seismic Derived Rock Properties and Structural Attributes in the Eagle Ford Play", presented in August, 2013, as well as a corresponding presentation made in April, 2013 at the Southwest AAPG conference. This paper and presentation are incorporated by reference herein.

The invention claimed is:

1. A computer-implemented method for improving imaging of a formation to further improve drilling or completing a first wellbore to recover hydrocarbons from the formation, the first wellbore for which microseismic data has not been obtained being located in the formation in which a second wellbore is located, the method comprising:
   obtaining and storing in a memory storage device microseismic data imaging the formation and acquired by second seismic acquisition equipment in response to a second stimulation of the second wellbore;
   using a programmed processor in operable communication with the memory storage device to determine from the microseismic data a second microseismic density volume for the second wellbore and storing the second microseismic density volume in the memory storage device;
   obtaining and storing in the memory storage device surface seismic data imaging the formation and acquired by first seismic acquisition equipment in relation to a first stimulation of the formation in which the first and second wellbores are located;
   using the programmed processor to determine seismic attributes and rock properties at least from the surface seismic data acquired by the first seismic equipment;
   using the programmed processor to perform an optimization analysis to select a model and one or more of the determined seismic attributes and rock properties that best match the determined second microseismic density volume for the second wellbore;
   using the programmed processor to calculate a first microseismic density volume for the first wellbore using the selected model and the one or more determined seismic attributes and rock properties;
   using the programmed processor to estimate a stimulated reservoir volume in the first wellbore, wherein the estimated stimulated reservoir volume is the calculated first microseismic density volume and is indicative of recovery of hydrocarbons from the first wellbore;
   using the programmed processor to determine a characteristic for drilling or completing the first wellbore in the formation based on the estimated stimulated reservoir volume; and
   drilling or stimulating the first wellbore in the formation based on the determined characteristic.

2. The method of claim 1 wherein the optimization analysis is a stepwise regression.

3. The method of claim 2 wherein using the programmed processor to perform the optimization analysis comprises:
   using the programmed processor to compute one or more ellipsoidal models around the second wellbore;
   using the programmed processor to multiply the one or more ellipsoidal models by the seismic attributes and rock properties; and
   using the programmed processor to perform a stepwise regression analysis.

4. The method of claim 1 wherein using the programmed processor to determine from the microseismic data the second microseismic density volume for the second wellbore comprises calculations based on event count per unit volume.

5. The method of claim 1 wherein using a programmed processor to determine from the microseismic data the second microseismic density volume for the second wellbore comprises calculations based on event magnitude per unit volume.

6. The method of claim 1 wherein using a programmed processor to determine from the microseismic data the second microseismic density volume for the second wellbore comprises applying a smoothing filter to a calculated microseismic density volume.

7. The method of claim 1 wherein the seismic attributes and rock properties are selected from the group consisting of: curvature volumes, coherency volumes, p-wave velocity, s-wave velocity, density, acoustic impedance, shear impedance, Bulk modulus, Young's modulus, and Poisson's ratio.

8. The method of claim 1 wherein using the programmed processor to calculate the first microseismic density volume further comprises:
   using the programmed processor to compute one or more ellipsoidal models around the first wellbore;
   using the programmed processor to multiply the one or more ellipsoidal models by the determined seismic attributes and rock properties that best match the determined second microseismic density volume for the second wellbore; and
   using the programmed processor to apply one or more coefficients determined in a stepwise regression analysis.

9. The method of claim 1, wherein obtaining and storing the microseismic data acquired by the second seismic acquisition equipment comprises obtaining and storing the microseismic data acquired by the second seismic acquisition equipment including downhole receivers, surface receivers, shallow receivers in shallow instrument wells, or any combination thereof; and wherein obtaining and storing the surface seismic data acquired by the first seismic acquisition equipment comprises obtaining and storing the surface seismic data acquired by the first seismic acquisition equipment including a surface seismic technique acquiring surface three-dimensional seismic before, after, or contemporaneously with the acquisition of the microseismic data.

10. The method of claim 1, wherein the first seismic acquisition equipment is the same as or different from the second seismic acquisition equipment, and wherein the first stimulation is the same as or different from the second stimulation.

11. The method of claim 1, further comprising using the programmed processor to determine a parameter for the drilling or the completion of the first wellbore for recovery of hydrocarbons based on the estimated stimulated reservoir volume.

12. The method of claim 1, wherein using the programmed processor to determine the characteristic for drilling or completing the first wellbore in the formation based on the estimated stimulated reservoir volume comprises determining well spacing for the first wellbore relative to the second wellbore to achieve a desired relationship between the estimated stimulated reservoir volume for the first wellbore and the second determined microseismic density volume for the second wellbore.

13. The method of claim 1, wherein using the programmed processor to determine the characteristic for drilling or completing the first wellbore in the formation based on the estimated stimulated reservoir volume comprises determining stimulation parameters for the first wellbore to achieve the estimated stimulated reservoir volume.

14. A computer-implemented method of improving imaging of a formation to further improve completing a second wellbore in Hall the formation to recover hydrocarbons from the formation based on a first stimulation of a first stimulated wellbore in the formation for which microseismic data is available, the method comprising:
 obtaining microseismic measurements imaging the formation and acquired by first seismic acquisition equipment in response to the first stimulation of the first stimulated wellbore;
 obtaining surface seismic measurements imaging the formation and acquired by second seismic acquisition equipment in relation to a second stimulation of the formation;
 using a programmed processor to determine a stimulated reservoir volume for the second wellbore by calculating an estimated microseismic density volume for the second wellbore, the calculating the estimated microseismic density volume for the second wellbore further comprising:
  using the programmed processor to perform an optimization analysis to select a model and one or more seismic attributes or rock properties derived from the surface seismic measurements to best match a determined microseismic density volume for the first stimulated wellbore derived from the microseismic measurements of the first stimulation of the first stimulated wellbore; and
  using the programmed processor to calculate an estimated microseismic density volume for the second wellbore using the selected model and the one or more seismic attributes or rock properties;
 determining stimulation parameters for the second wellbore to achieve a desired stimulated reservoir volume; and
 stimulating the second wellbore in the formation using the completion equipment based on the determined stimulation parameters.

15. The method of claim 14 wherein the stimulation parameters are selected from the group consisting of: frac pressure, frac volume, propant concentration, and propant size.

16. The method of claim 14 wherein the seismic attributes and rock properties are selected from the group consisting of: curvature volumes, coherency volumes, surface seismic attribute, p-wave velocity, s-wave velocity, density, acoustic impedance, shear impedance, Bulk modulus, Young's modulus, and Poisson's ratio.

17. The method of claim 14 wherein the optimization analysis is a stepwise regression.

18. The method of claim 14 wherein using the programmed processor to perform the optimization analysis to select the model and the one or more seismic attributes or rock properties derived from the surface seismic measurements to best match the determined microseismic density volume for the first stimulated wellbore derived from the microseismic measurements of the first stimulation of the first stimulated wellbore comprises:
 using the programmed processor to compute one or more ellipsoidal models around the first stimulated wellbore;
 using the programmed processor to multiply the one or more ellipsoidal models by the seismic attributes and rock properties; and
 using the programmed processor to perform a stepwise regression analysis.

19. The method of claim 14 wherein using the programmed processor to calculate the estimated microseismic density volume for the second wellbore using the selected model and the one or more seismic attributes or rock properties comprises:
 using the programmed processor to compute one or more ellipsoidal models around the second wellbore;
 using the programmed processor to multiply the one or more ellipsoidal models by the seismic attributes and rock properties; and
 using the programmed processor to apply one or more coefficients determined in a stepwise regression analysis.

20. A computer-implemented method of improving imaging of a formation to further improve drilling a proposed second wellbore in the formation to recover hydrocarbons from the formation, the proposed second wellbore being relative to a first stimulated wellbore in the formation for which microseismic data is available, the method comprising:
 obtaining microseismic measurements imaging the formation and acquired by first seismic acquisition equipment in response to a first stimulation of the first stimulated wellbore;
 obtaining surface seismic measurements imaging the formation and acquired by second seismic acquisition equipment in relation to a second stimulation of the formation;
 using a programmed processor to determine a stimulated reservoir volume for the proposed second wellbore by calculating an estimated microseismic density volume for the proposed second wellbore, the calculating the estimated microseismic density volume for the proposed second wellbore further comprising:
  using the programmed processor to perform an optimization analysis to select a model and one or more seismic attributes or rock properties derived from the surface seismic measurements to best match a determined microseismic density volume for the first wellbore derived from the microseismic measurements of the first stimulation of the first wellbore; and
  using the programmed processor to calculate an estimated microseismic density volume for the proposed second wellbore using the selected model and the one or more seismic attributes or rock properties;
 determining well spacing for the proposed second wellbore relative to the first wellbore to achieve a desired relationship between the stimulated reservoir volume for the proposed second wellbore and the determined microseismic density volume for the first wellbore; and
 drilling the proposed second wellbore in the formation using the drilling equipment relative to the first stimulated wellbore based on the determined well spacing.

21. The method of claim 20 wherein the seismic attributes and rock properties are selected from the group consisting of: curvature volumes, coherency volumes, surface seismic attribute, p-wave velocity, s-wave velocity, density, acoustic impedance, shear impedance, Bulk modulus, Young's modulus, and Poisson's ratio.

22. The method of claim 20 wherein the optimization analysis is a stepwise regression.

23. The method of claim 20 wherein using the programmed processor to perform the optimization analysis to select the model and the one or more seismic attributes or rock properties derived from the surface seismic measurements to best match the determined microseismic density volume for the first wellbore derived from the microseismic measurements of the first stimulation of the first wellbore comprises:

using the programmed processor to compute one or more ellipsoidal models around the first wellbore;

using the programmed processor to multiply the one or more ellipsoidal models by the seismic attributes and rock properties; and using the programmed processor to perform a stepwise regression analysis.

24. The method of claim 20 wherein using the programmed processor to calculate the estimated microseismic density volume for the proposed second wellbore using the selected model and the one or more seismic attributes or rock properties comprises:

using the programmed processor to compute one or more ellipsoidal models around the proposed second wellbore;

using the programmed processor to multiply the one or more ellipsoidal models by the seismic attributes and rock properties; and using the programmed processor to apply one or more coefficients determined in a stepwise regression analysis.

* * * * *

UNITED STATES PATENT AND TRADEMARK OFFICE
CERTIFICATE OF CORRECTION

PATENT NO. : 10,401,512 B1
APPLICATION NO. : 14/247988
DATED : September 3, 2019
INVENTOR(S) : Robert Meek et al.

Page 1 of 1

It is certified that error appears in the above-identified patent and that said Letters Patent is hereby corrected as shown below:

In the Claims

Claim 14, Column 11, Line 18, delete the word "Hall"

Signed and Sealed this
Eighth Day of October, 2019

Andrei Iancu
*Director of the United States Patent and Trademark Office*